United States Patent
Mohnacky et al.

(10) Patent No.: US 12,277,125 B2
(45) Date of Patent: Apr. 15, 2025

(54) CONTENT ANALYSIS SYSTEM AND METHOD

(71) Applicant: bundleIQ Inc., West Palm Beach, FL (US)

(72) Inventors: Nicholas Lee Mohnacky, West Palm Beach, FL (US); Jeffrey Thomas Robbins, Palm Beach Gardens, FL (US)

(73) Assignee: BUNDLEIQ INC., West Palm Beach, FL (US)

( * ) Notice: Subject to any disclaimer, the term of this patent is extended or adjusted under 35 U.S.C. 154(b) by 0 days.

(21) Appl. No.: 18/107,913

(22) Filed: Feb. 9, 2023

(65) Prior Publication Data

US 2023/0252063 A1 Aug. 10, 2023

Related U.S. Application Data

(60) Provisional application No. 63/308,374, filed on Feb. 9, 2022.

(51) Int. Cl.
| | | |
|---|---|---|
| *G06F 16/00* | (2019.01) | |
| *G06F 16/2457* | (2019.01) | |
| *G06F 16/248* | (2019.01) | |
| *G06F 16/35* | (2019.01) | |
| *H04L 67/306* | (2022.01) | |

(52) U.S. Cl.
CPC ...... *G06F 16/24575* (2019.01); *G06F 16/248* (2019.01); *G06F 16/35* (2019.01); *H04L 67/306* (2013.01)

(58) Field of Classification Search
CPC .. G06F 16/24575; G06F 16/248; G06F 16/35; G06F 16/90332; G06F 16/9532; G06F 16/9538

See application file for complete search history.

(56) References Cited

U.S. PATENT DOCUMENTS

| | | | |
|---|---|---|---|
| 7,516,492 B1 * | 4/2009 | Nisbet | H04L 63/105 717/136 |
| 7,725,485 B1 * | 5/2010 | Sahami | G06F 16/35 707/766 |
| 8,498,941 B2 * | 7/2013 | Felsher | G06F 21/6245 705/51 |
| 10,083,213 B1 | 9/2018 | Podgorny et al. | |
| 10,855,771 B1 * | 12/2020 | Priestley | H04L 65/4038 |
| 11,809,508 B1 * | 11/2023 | Kallman | G06F 16/951 |
| 11,869,635 B2 * | 1/2024 | Harper | G10L 17/26 |
| 2013/0344468 A1 | 12/2013 | Lindsay et al. | |
| 2015/0113283 A1 * | 4/2015 | Corella | G06F 21/32 713/185 |

(Continued)

OTHER PUBLICATIONS

Non-Final Office Action issued in related U.S. Appl. No. 18/166,944 on issue Date; Mar. 12, 2024.

(Continued)

*Primary Examiner* — Noosha Arjomandi
(74) *Attorney, Agent, or Firm* — Brian J. Colandreo; Jeffrey T. Placker; Holland & Knight LLP

(57) ABSTRACT

A computer-implemented method, computer program product and computing system for maintaining a non-public content repository; and analyzing user-generated content to identify related content included within the non-public content repository.

30 Claims, 11 Drawing Sheets

(56) References Cited

U.S. PATENT DOCUMENTS

| | | |
|---|---|---|
| 2015/0302097 A1 | 10/2015 | Focacci |
| 2016/0085799 A1 | 3/2016 | Kim et al. |
| 2016/0203143 A1* | 7/2016 | Kritt .................... G06F 16/338 |
| | | 707/722 |
| 2016/0315944 A1* | 10/2016 | Li ....................... G06F 16/9535 |
| 2017/0206797 A1 | 7/2017 | Solomon et al. |
| 2018/0131645 A1 | 5/2018 | Magliozzi et al. |
| 2020/0125575 A1* | 4/2020 | Ghoshal ................ G06F 3/0484 |
| 2021/0241869 A1* | 8/2021 | Muse ...................... G06F 9/542 |
| 2021/0382916 A1* | 12/2021 | Krishnamoorthy ... G06F 9/5061 |
| 2022/0012268 A1* | 1/2022 | Ghoshal ................ G06F 16/906 |
| 2022/0174056 A1* | 6/2022 | Kihara ................ H04L 63/0815 |
| 2022/0269703 A1* | 8/2022 | Gentilcore ........ G06F 16/24578 |
| 2022/0269794 A1* | 8/2022 | Feng ....................... G06F 21/10 |
| 2023/0099588 A1 | 3/2023 | Zhou et al. |
| 2023/0103076 A1 | 3/2023 | Zhou et al. |
| 2023/0185768 A1* | 6/2023 | Inghelbrecht ............ G06N 3/08 |
| | | 706/12 |
| 2023/0418793 A1* | 12/2023 | Urdiales ............... G06F 16/215 |

OTHER PUBLICATIONS

Final Office Action issued in related U.S. Appl. No. 18/166,944 on Sep. 11, 2024.

Non Final Office Action issued in related U.S. Appl. No. 18/166,944 on Feb. 25, 2025.

\* cited by examiner

CONTENT ANALYSIS SYSTEM AND METHOD

RELATED APPLICATION(S)

This application claims the benefit of U.S. Provisional Application No. 63/308,374 filed on 9 Feb. 2022, the entire contents of which are incorporated herein by reference.

TECHNICAL FIELD

This disclosure relates to content analysis systems and methods and, more particularly, to content analysis systems and methods that interface with a content repository.

BACKGROUND

The ubiquitous availability of data today makes performing research much easier than it was 30 years ago when such research would likely be performed in a library. Unfortunately, the vast quantity of such data available and the number of resources from which it may be obtained often makes it difficult for the user to discern good data from bad data. And being bad data is available, a user may assume that bad data is actually good data and go down a dark path that achieves a flawed result.

SUMMARY OF DISCLOSURE

BACK END

In one implementation, a computer-implemented method is executed on a computing device and includes: maintaining a non-public content repository; and analyzing user-generated content to identify related content included within the non-public content repository.

One or more of the following features may be included. Analyzing user-generated content to identify related content included within the non-public content repository may include: proactively analyzing user-generated content to identify related content included within the non-public content repository. Analyzing user-generated content to identify related content included within the non-public content repository may include: reactively analyzing user-generated content to identify related content included within the non-public content repository. At least a portion of the related content may be presented to the user. Presenting at least a portion of the related content to the user may include: presenting related content to the user that clarifies a question in the user-generated content. Presenting at least a portion of the related content to the user may include: presenting related content to the user that affirms the user-generated content. Presenting at least a portion of the related content to the user may include: presenting related content to the user that corrects the user-generated content. The user-generated content may include: user-generated content that was generated on a word processor. The non-public content repository may include: non-public content. The non-public content repository may include: trusted public content.

In another implementation, a computer program product resides on a computer readable medium and has a plurality of instructions stored on it. When executed by a processor, the instructions cause the processor to perform operations including maintaining a non-public content repository; and analyzing user-generated content to identify related content included within the non-public content repository.

One or more of the following features may be included. Analyzing user-generated content to identify related content included within the non-public content repository may include: proactively analyzing user-generated content to identify related content included within the non-public content repository. Analyzing user-generated content to identify related content included within the non-public content repository may include: reactively analyzing user-generated content to identify related content included within the non-public content repository. At least a portion of the related content may be presented to the user. Presenting at least a portion of the related content to the user may include: presenting related content to the user that clarifies a question in the user-generated content. Presenting at least a portion of the related content to the user may include: presenting related content to the user that affirms the user-generated content. Presenting at least a portion of the related content to the user may include: presenting related content to the user that corrects the user-generated content. The user-generated content may include: user-generated content that was generated on a word processor. The non-public content repository may include: non-public content. The non-public content repository may include: trusted public content.

In another implementation, a computing system includes a processor and a memory system configured to perform operations including maintaining a non-public content repository; and analyzing user-generated content to identify related content included within the non-public content repository.

One or more of the following features may be included. Analyzing user-generated content to identify related content included within the non-public content repository may include: proactively analyzing user-generated content to identify related content included within the non-public content repository. Analyzing user-generated content to identify related content included within the non-public content repository may include: reactively analyzing user-generated content to identify related content included within the non-public content repository. At least a portion of the related content may be presented to the user. Presenting at least a portion of the related content to the user may include: presenting related content to the user that clarifies a question in the user-generated content. Presenting at least a portion of the related content to the user may include: presenting related content to the user that affirms the user-generated content. Presenting at least a portion of the related content to the user may include: presenting related content to the user that corrects the user-generated content. The user-generated content may include: user-generated content that was generated on a word processor. The non-public content repository may include: non-public content. The non-public content repository may include: trusted public content.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
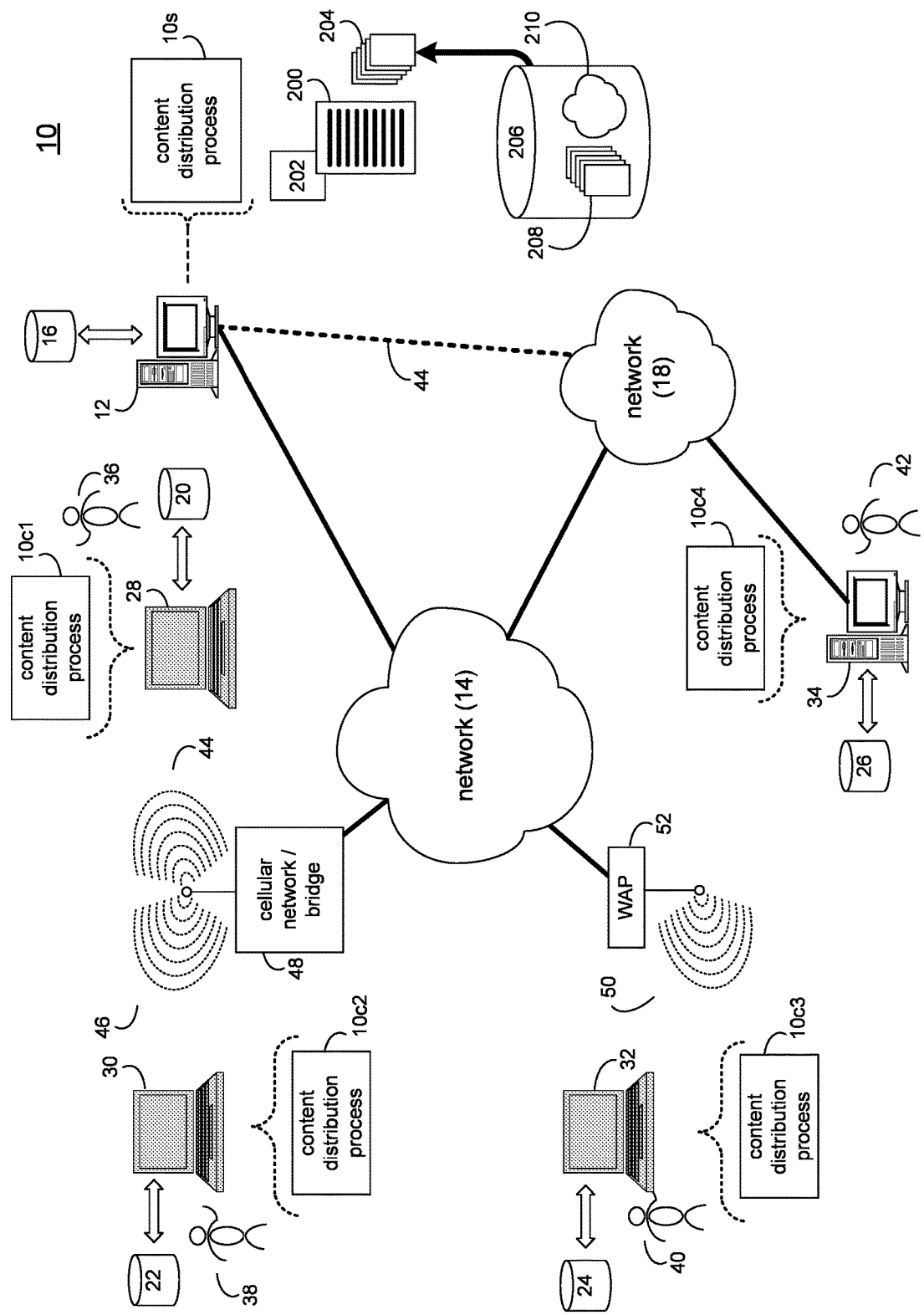
FIG. 1 is a diagrammatic view of a distributed computing network including a computing device that executes a content analysis process according to an embodiment of the present disclosure.

Referring to FIG. 1, there is shown content analysis process 10. Content analysis process 10 may be implemented as a server-side process, a client-side process, or a hybrid server-side/client-side process. For example, content analysis process 10 may be implemented as a purely server-side process via content analysis process 10s. Alternatively, content analysis process 10 may be implemented as a purely client-side process via one or more of content analysis process 10c1, content analysis process 10c2, content analysis process 10c3, and content analysis process 10c4. Alternatively still, content analysis process 10 may be implemented as a hybrid server-side/client-side process via content analysis process 10s in combination with one or more of content analysis process 10c1, content analysis process 10c2, content analysis process 10c3, and content analysis process 10c4. Accordingly, content analysis process 10 as used in this disclosure may include any combination of content analysis process 10s, content analysis process 10c1, content analysis process 10c2, content analysis process 10c3, and content analysis process 10c4.

Content analysis process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, a smartphone, or a cloud-based computing platform.

The instruction sets and subroutines of content analysis process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of content analysis processes 10c1, 10c2, 10c3, 10c4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of content analysis processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; RAID devices; random access memories (RAM); read-only memories (ROM), and all forms of flash memory storage devices.

Examples of client electronic devices 28, 30, 32, 34 may include, but are not limited to, a smartphone (not shown), a personal digital assistant (not shown), a tablet computer (not shown), laptop computers 28, 30, 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, iOS™, Linux™, or a custom operating system.

Users 36, 38, 40, 42 may access content analysis process 10 directly through network 14 or through secondary network 18. Further, content analysis process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, laptop computer 28 and laptop computer 30 are shown wirelessly coupled to network 14 via wireless communication channels 44, 46 (respectively) established between laptop computers 28, 30 (respectively) and cellular network/bridge 48, which is shown directly coupled to network 14. Further, laptop computer 32 is shown wirelessly coupled to network 14 via wireless communication channel 50 established between laptop computer 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between laptop computer 32 and WAP 52. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

FRONT END

Figure 2:
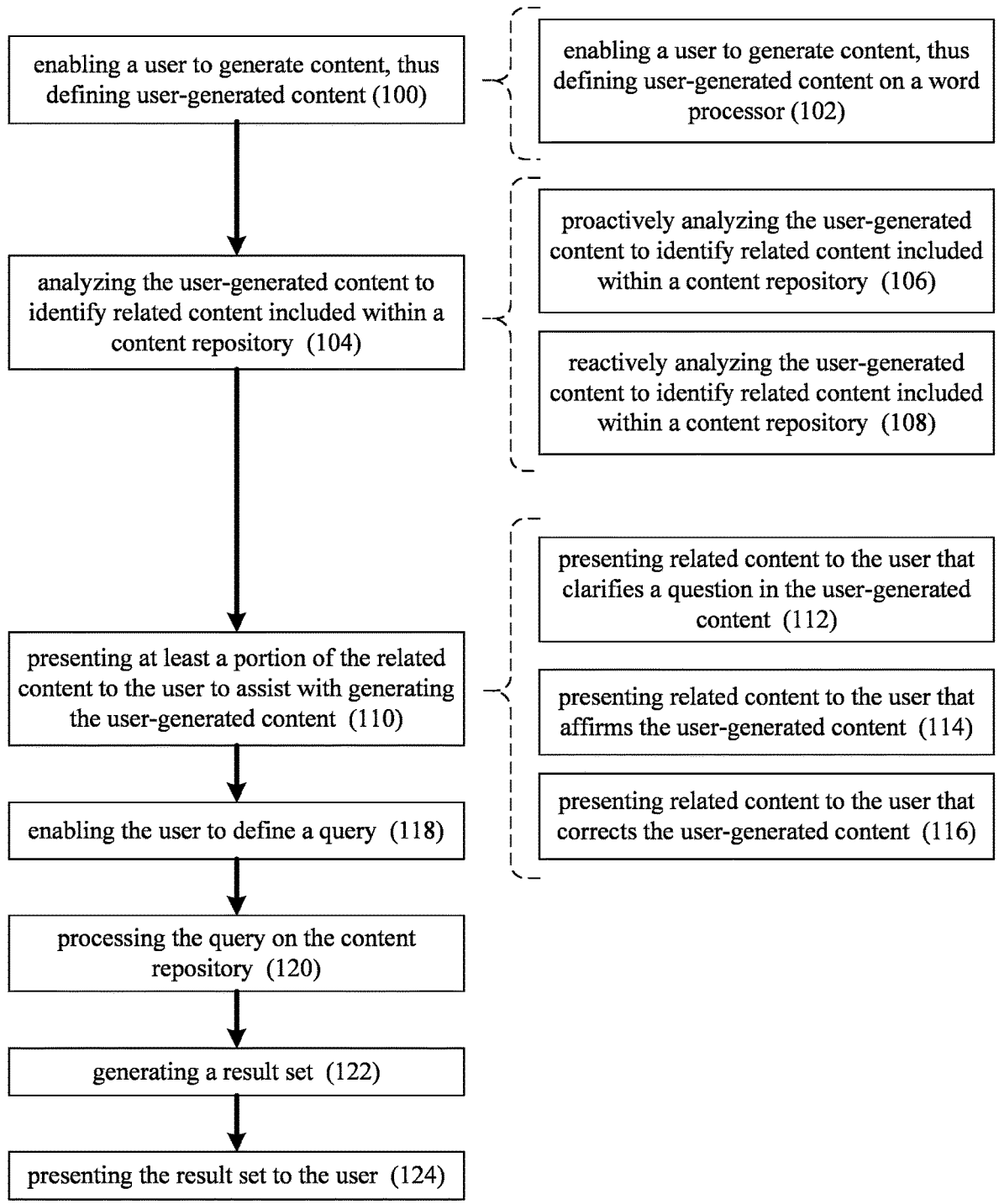
FIG. 2 is a flowchart of the content analysis process of FIG. 1 according to an embodiment of the present disclosure.

Referring also to FIG. 2, content analysis process 10 may enable 100 a user (e.g., user 36) to generate content, thus defining user-generated content (e.g., user-generated content 200). When enabling 100 a user (e.g., user 36) to generate content, thus defining user-generated content (e.g., user-generated content 200), content analysis process 10 may enable 102 the user (e.g., user 36) to generate content on a word processor (e.g., word processor 202), thus defining user-generated content (e.g., user-generated content 200). For example, assume that the user (e.g., user 36) is generating a document (e.g., user-generated content 200) on a word processor (e.g., word processor 202), wherein content analysis process 10 may provide assistance to the user (e.g., user 36) with the generation of such document (e.g., user-generated content 200).

Specifically, content analysis process 10 may analyze 104 the user-generated content (e.g., user-generated content 200) to identify related content (e.g., related content 204) included within a content repository (e.g., content repository 206). In certain embodiments, the content repository (e.g., content repository 206) may include: a non-public content repository (e.g., non-public content repository 208) and/or a public content repository (e.g., public content repository 210).

Examples of non-public content repository 208 may include but are not limited to a curated collection of documents/content that is obtained/identified by e.g., user 36, such as internal documents & content authored by/available to user 36 (e.g., a private collection of content that was authored/validated by user 36) and/or external documents & content identified/validated by user 36 (e.g., such as that available on a trusted public website). Examples of public content repository 210 may include but are not limited to generally available collections of documents/content, such as external documents & content available on public websites & information resources on e.g., the internet.

For example and concerning the manner in which content analysis process 10 may analyze 104 user-generated content 200 to identify related content 204 included within content repository 206, content analysis process 10 may utilize an AI-powered discovery engine that uses natural language processing (NLP) and mathematical formulas to quickly find relevant content and ideas for research inspiration. Accordingly, content analysis process 10 may allow users (e.g., user 36) to draw inspiration from their research, create meaningful documents with greater depth, and save time by eliminating the need to search manually. Specifically, content analysis process 10 may tokenize text (e.g., included within user-generated content 200) into vectors that may then be compared (e.g., using a dot product formula) to generate normalized scores that indicate the level of similarity between two vectors (e.g., that represent two portions of text). Accordingly, this vectorization process effectuated by content analysis process 10 may help users (e.g., user 36) gain insights that they may not have thought of before.

For example, let's assume that a user (e.g., user 36) wants to write an article about a fast-growing food and beverage brand. In this example, the user (e.g., user 36) may utilize content analysis process 10 to help with their research and writing. First, the user (e.g., user 36) may prime content repository 206 with research material (e.g., concerning the fast-growing food and beverage brand) by uploading and saving files within content repository 206.

Figure 2A:
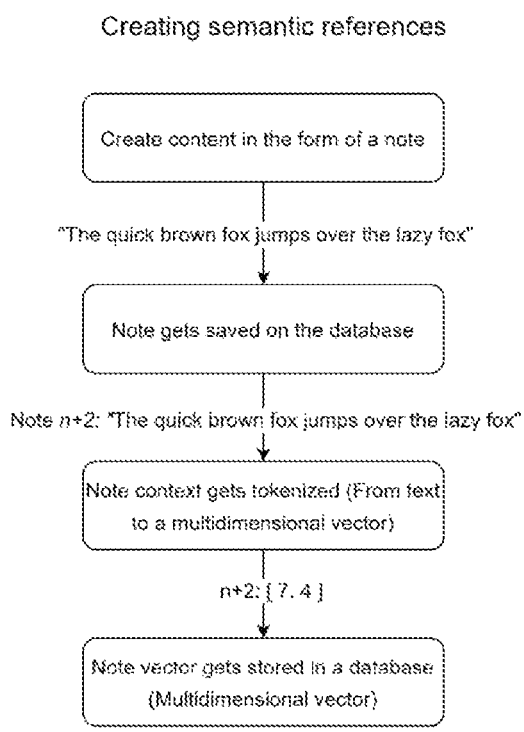
FIG. 2A is a flowchart of a semantic tokenization process performed by the content analysis process of FIG. 1 according to an embodiment of the present disclosure.

When new material (e.g., new files) gets added to content repository 206, content analysis process 10 may save the same to various databases, examples of which may include but are not limited to primary databases (e.g., mongoDB), secondary databases (e.g., Lambda function+S3), and tertiary databases (e.g., ElasticSearch). The raw text from these documents (e.g., the new files) may be saved in the primary and tertiary databases. As these documents (e.g., the new files) are saved or updated in the primary database, the event triggers the semantic tokenization process, which transforms the documents (e.g., the new files) into vectors. This newly vectorized data may then get saved in the secondary database along with the document ID contained in the primary database. A flowchart of an example of such a semantic tokenization process that may be performed by content analysis process 10 is shown in FIG. 2A.

As will be discussed below in greater detail, when users (e.g., user 36) want to draw inspiration from their research (e.g., concerning the fast-growing food and beverage brand), the user (e.g., user 36) may trigger an analysis function that runs natural language processing on their document (e.g., user-generated content 200) and suggests related material from internal or external knowledge (e.g., defined within content repository 206).

Specifically, content analysis process 10 use of such an AI-powered discovery engine may help users (e.g., user 36) quickly find relevant content and ideas that they may not have thought of before, thus saving them time by eliminating the need to perform manual searching and allowing allows users (e.g., user 36) to create more meaningful documents with greater depth from their research.

Figure 2B:
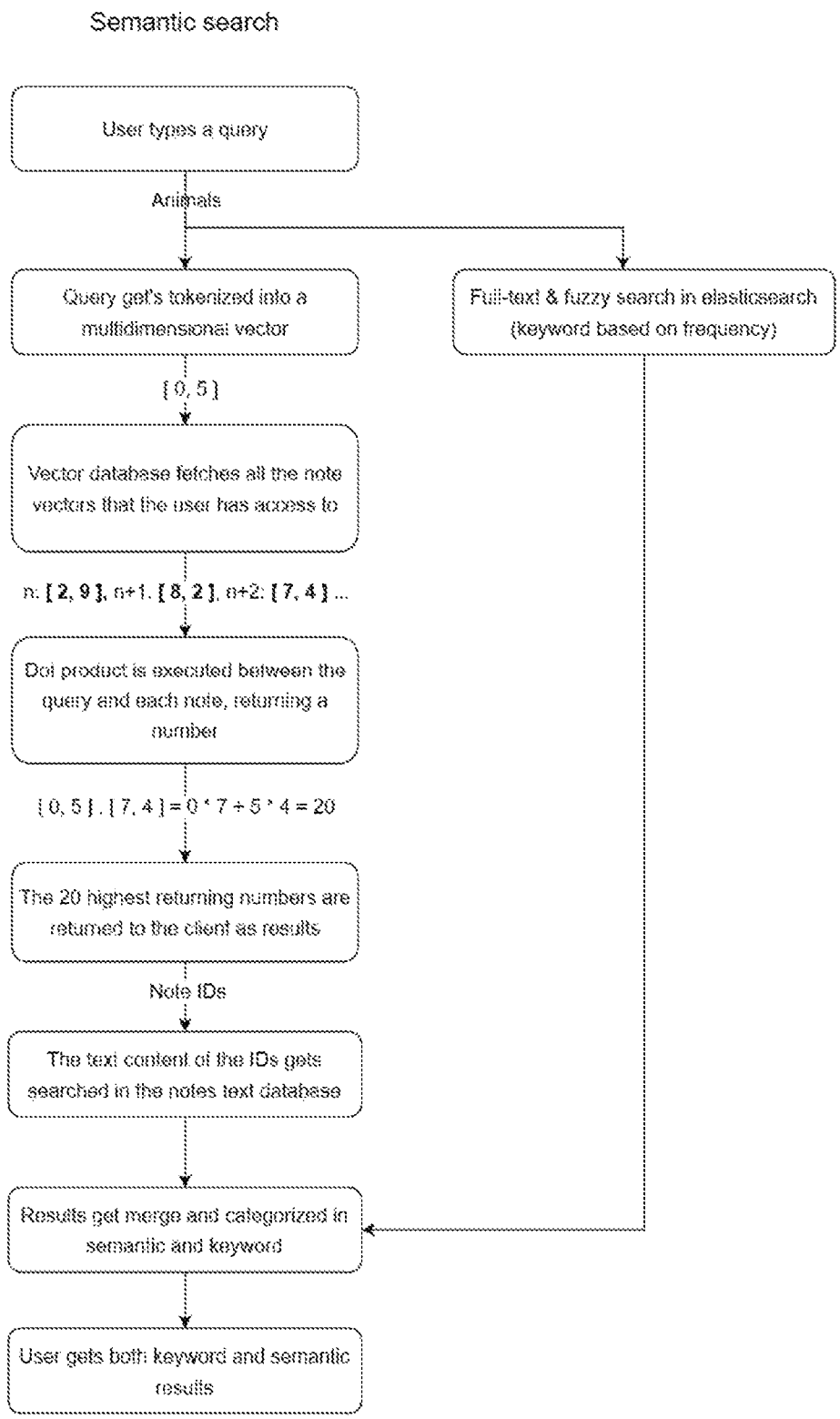
FIG. 2B is a flowchart of a semantic searching process performed by the content analysis process of FIG. 1 according to an embodiment of the present disclosure.

The Semantic API endpoint may get called when a user (e.g., user 36) searches or analyzes portions or the entirety of a document (e.g., user-generated content 200) resulting in contextually-relevant connections. When a user (e.g., user 36) triggers an analysis of their document (e.g., user-generated content 200), content analysis process 10 may use natural language processing (NLP) techniques to break down the text into smaller units and create vectors of meaning, which may then be compared using a mathematical formula called dot product. Linear algebra may be used in neural network layers to maximize the dot product between the query and key vector, resulting in a normalized score that indicates how similar the two vectors are. Once this score is determined, the results may be merged hierarchically with the list of suggestions being defined via the tertiary databases (e.g., ElasticSearch). A flowchart of an example of such a semantic searching methodology that may be performed by content analysis process 10 is shown in FIG. 2B.

Content analysis process 10 may then utilize these normalized scores to rank the suggestions and present them to the user (e.g., user 36) in order of relevance. The user (e.g., user 36) may then select one or more of these suggestions, which may be added to their document (e.g., user-generated content 200). This supplementation process may be repeated until the user (e.g., user 36) has completed their analysis (e.g., concerning the fast-growing food and beverage brand) and is satisfied with the results. By leveraging content analysis process 10, users (e.g., user 36) may be able to quickly and accurately search through large amounts of data and gain insights that would otherwise be difficult or impossible to obtain.

In summary, the analysis process may be achieved via a semantic search. A user (e.g., user 36) may type in a query or may trigger a text analysis, which may get tokenized into a multidimensional vector. This multidimensional vector may then be compared (e.g., via dot product) to the multidimensional vectors of all documents that the user has access to (e.g., those defined within content repository 206), wherein e.g., the twenty highest returning numbers may be returned as results (e.g., related content 204). The suggested documents may then be merged and categorized into a hierarchical feed comprised of keyword and semantic results for the user (e.g. user 36).

As is known in the art, machine learning (ML) is a field of inquiry devoted to understanding and building methods that 'learn', that is, methods that leverage data to improve performance on some set of tasks. It is seen as a part of artificial intelligence. Machine learning algorithms build a model based on sample data, known as training data, in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

A subset of machine learning is closely related to computational statistics, which focuses on making predictions using computers, but not all machine learning is statistical learning. The study of mathematical optimization delivers methods, theory and application domains to the field of machine learning. Data mining is a related field of study, focusing on exploratory data analysis through unsupervised learning. Some implementations of machine learning use data and neural networks in a way that mimics the working of a biological brain. In its application across business problems, machine learning is also referred to as predictive analytics.

As is known in the art, a machine learning system or model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As the machine learning system navigates its problem space, the machine learning system is provided feedback that's analogous to rewards, which it tries to maximize. While three examples of machine learning approaches have been provided, it will be appreciated that other machine learning approaches are possible within the scope of the present disclosure.

As is known in the art, natural language processing (NLP) is an interdisciplinary subfield of linguistics, computer science, and artificial intelligence concerned with the interactions between computers and human language, in particular how to program computers to process and analyze large amounts of natural language data. The goal is a computer capable of "understanding" the contents of documents, including the contextual nuances of the language within them. The technology can then accurately extract information and insights contained in the documents as well as categorize and organize the documents themselves.

Figure 3A:
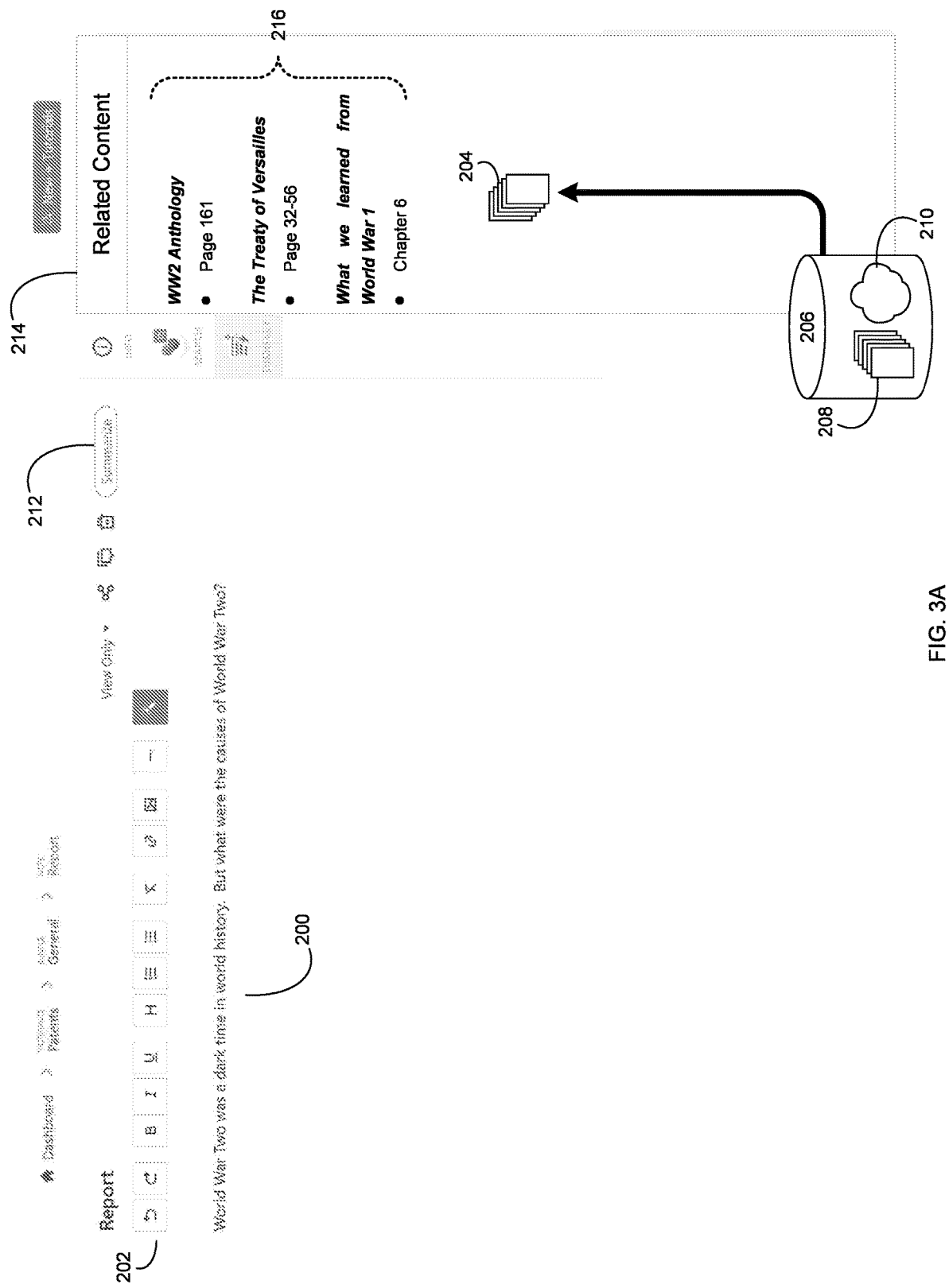
FIGS. 3A-3F are various diagrammatic views of user interfaces rendered by the content analysis process of FIG. 1 according to an embodiment of the present disclosure.

Referring also to FIG. 3A, when analyzing 104 the user-generated content (e.g., user-generated content 200) to identify related content (e.g., related content 204) included within a content repository (e.g., content repository 206), content analysis process 10 may proactively analyze 106 the user-generated content (e.g., user-generated content 200) to identify related content (e.g., related content 204) included within a content repository (e.g., content repository 206). For example and as user 36 generates user-generated content (e.g., user-generated content 200), content analysis process 10 may monitor the progress of the generation of user-generated content (e.g., user-generated content 200) and may routinely (e.g., every few seconds/every few words) analyze 104 the user-generated content (e.g., user-generated content 200) to identify related content (e.g., related content 204) included within the content repository (e.g., content repository 206).

Additionally/alternatively and when analyzing 104 the user-generated content (e.g., user-generated content 200) to identify related content (e.g., related content 204) included within a content repository (e.g., content repository 206), content analysis process 10 may reactively analyze 108 the user-generated content (e.g., user-generated content 200) to identify related content (e.g., related content 204) included within a content repository (e.g., content repository 206). For example and as user 36 generates user-generated content (e.g., user-generated content 200), content analysis process 10 may stand by until the user (e.g., user 36) initiates the analysis 104 of the user-generated content (e.g., user-generated content 200) to identify related content (e.g., related content 204) included within a content repository (e.g., content repository 206). Such initiation may occur by e.g., user 36 selecting "Summarize" icon 212.

Content analysis process 10 may present 110 at least a portion of the related content (e.g., related content 204) to the user (e.g., user 36) to assist with generating the user-generated content (e.g., user-generated content 200). This related content (e.g., related content 204) may be presented 110 to the user (e.g., user 36) within window 214 in various formats. For example, related content 204 may include a plurality of discrete pieces of content (e.g., pieces of content 216) within content repository 206, wherein the specific relevant passage within each discrete piece of content (e.g., pieces of content 216) may be identified by e.g., chapter or page.

Figure 3B:
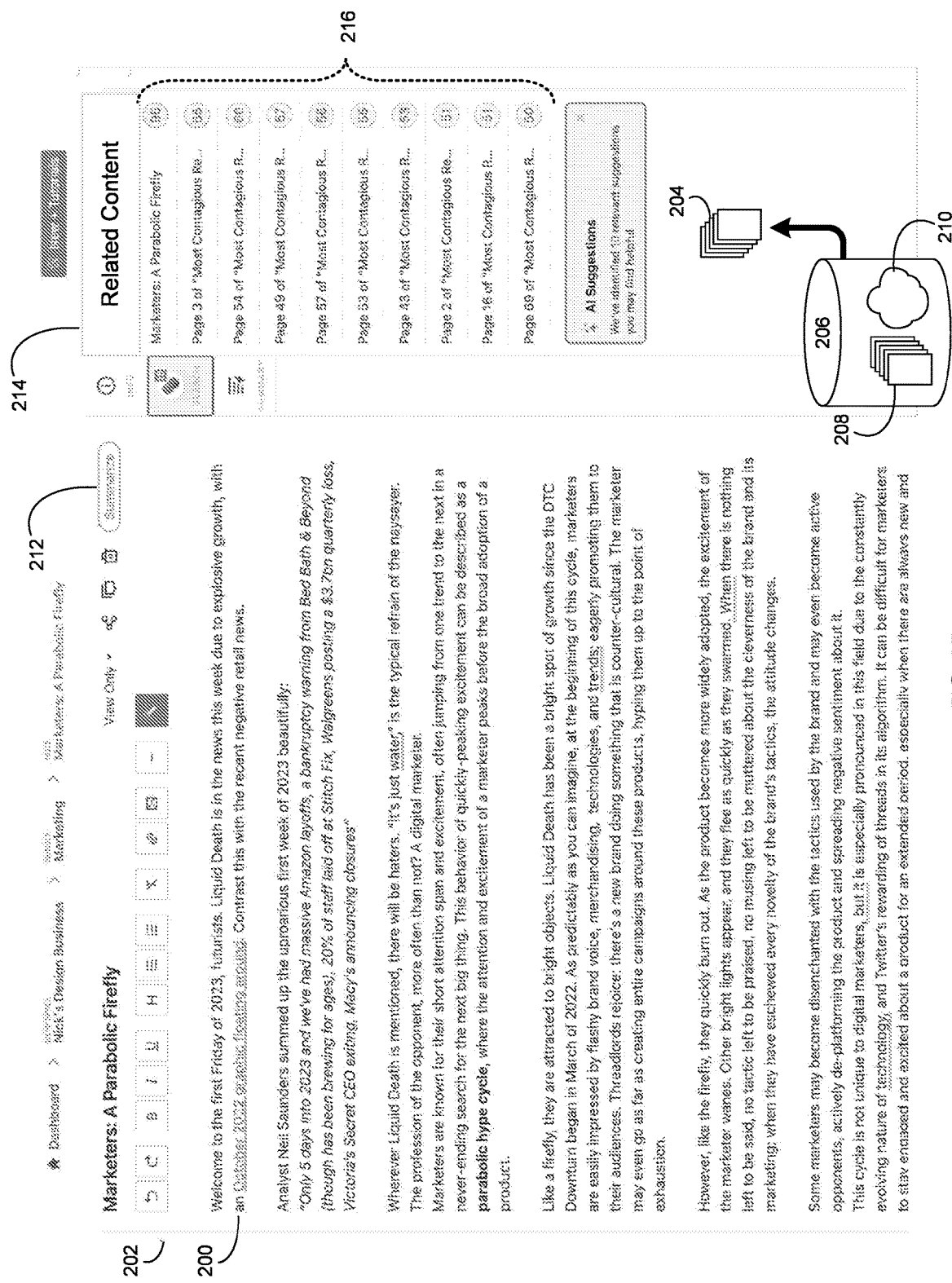

Referring also to FIG. 3B, there is shown a more complex example of user-generated content 200 and the manner in which related content 204 may be presented 110 to the user (e.g., user 36) within window 214. Again, related content 204 may include a plurality of discrete pieces of content (e.g., pieces of content 216) within content repository 206, wherein the specific relevant passage within each discrete piece of content (e.g., pieces of content 216) may be identified by e.g., chapter or page.

Figure 3C:
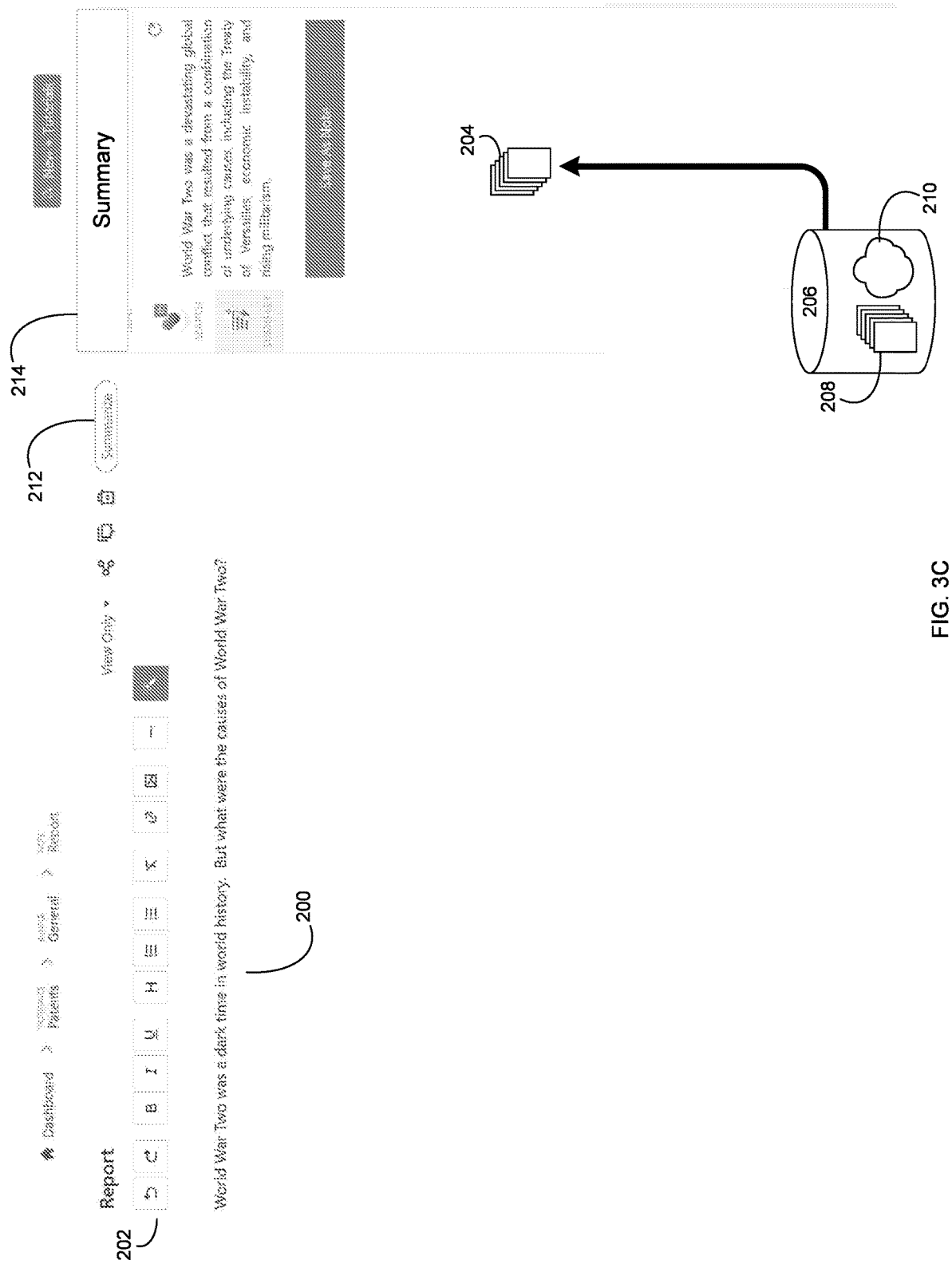

Referring also to FIG. 3C, when presenting 110 at least a portion of the related content (e.g., related content 204) to the user (e.g., user 36) to assist with generating the user-generated content (e.g., user-generated content 200), content analysis process 10 may present 112 related content (e.g., related content 204) to the user (e.g., user 36) that clarifies a question in the user-generated content (e.g., user-generated content 200). For example, if user-generated content 200 included the statement & question "World War Two was a dark time in world history. But what were the causes of World War Two?", content analysis process 10 may present 112 related content (e.g., related content 204) to the user (e.g., user 36) that clarifies such a question in the user-generated content (e.g., user-generated content 200), such as:

World War Two was a devastating global conflict that resulted from a combination of underlying causes, including the Treaty of Versailles, economic instability, and rising militarism.

Figure 3D:
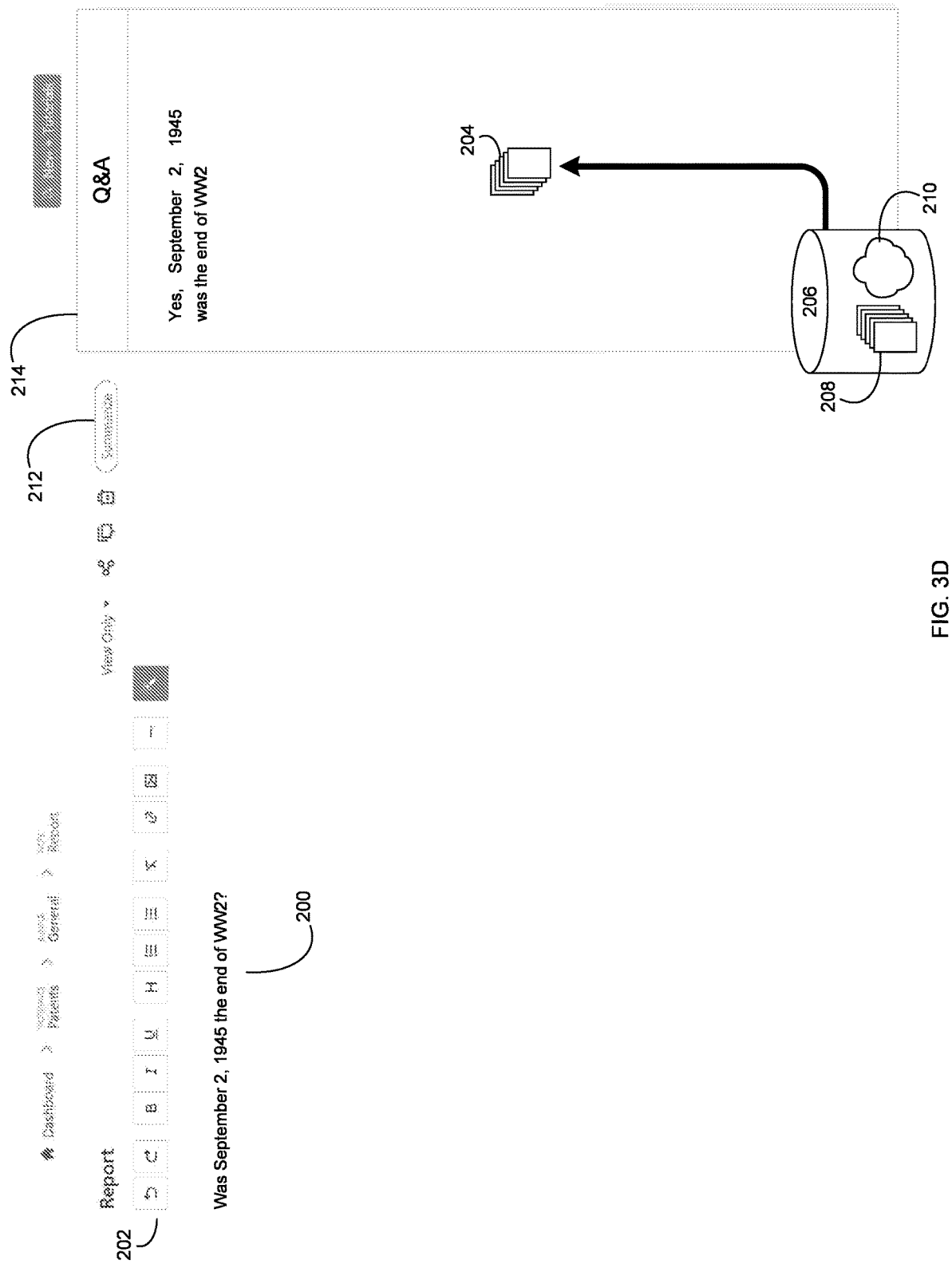

Referring also to FIG. 3D, when presenting 110 at least a portion of the related content (e.g., related content 204) to the user (e.g., user 36) to assist with generating the user-generated content (e.g., user-generated content 200), content analysis process 10 may present 114 related content (e.g., related content 204) to the user (e.g., user 36) that affirms the user-generated content (e.g., user-generated content 200). For example, if user-generated content 200 included the inquiry "Was Sep. 2, 1945 the end of WW2?", content analysis process 10 may present 114 related content (e.g., related content 204) to the user (e.g., user 36) that affirms the user-generated content (e.g., user-generated content 200), such as:

Yes, Sep. 2, 1945 was the end of WW2.

Figure 3E:
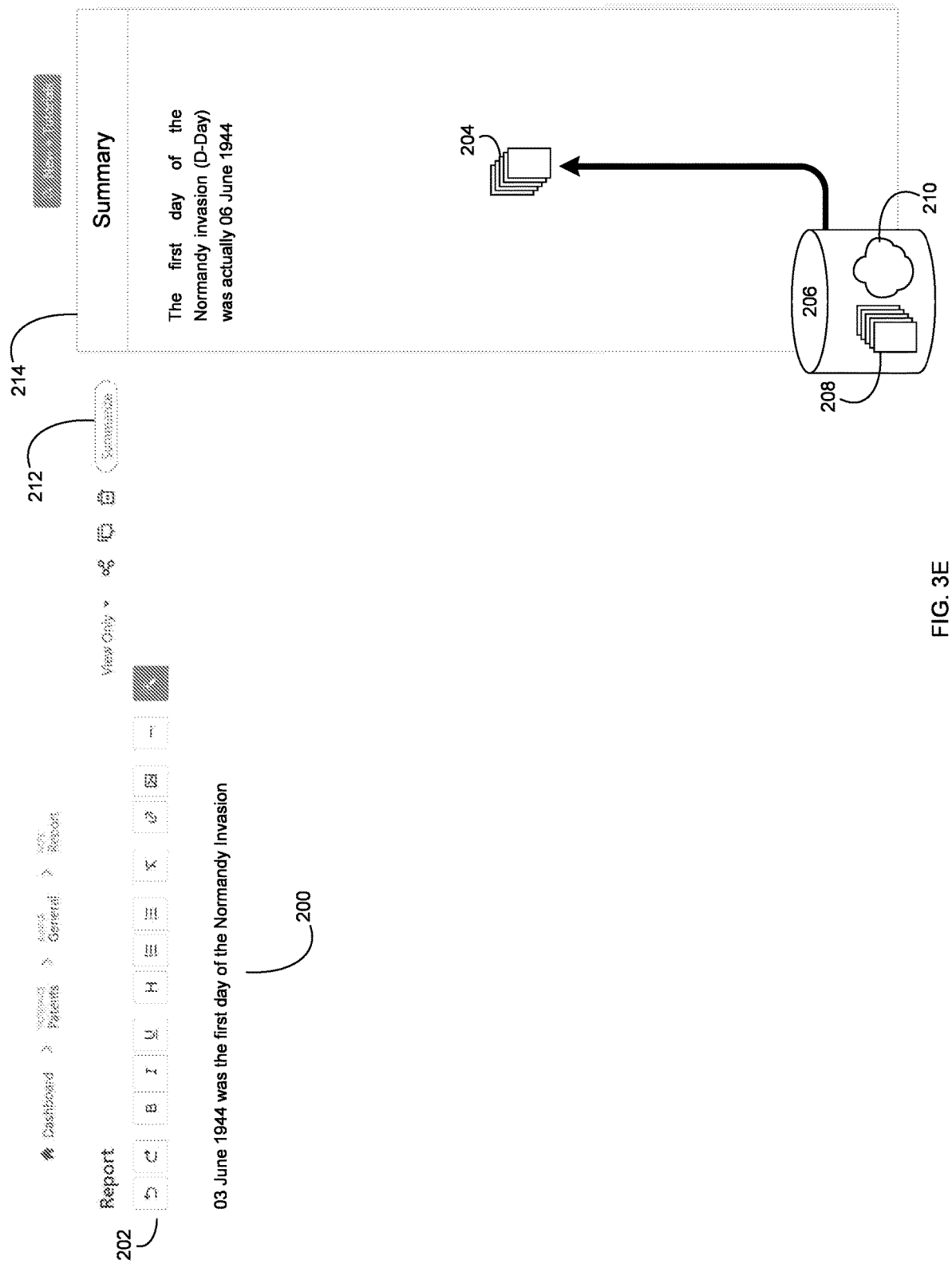

Referring also to FIG. 3E, when presenting 110 at least a portion of the related content (e.g., related content 204) to the user (e.g., user 36) to assist with generating the user-generated content (e.g., user-generated content 200), content analysis process 10 may present 116 related content (e.g., related content 204) to the user (e.g., user 36) that corrects the user-generated content (e.g., user-generated content 200). For example, if user-generated content 200 included the statement "3 Jun. 1944 was the first day of the Normandy Invasion", content analysis process 10 may present 116 related content (e.g., related content 204) to the user (e.g., user 36) that corrects the user-generated content (e.g., user-generated content 200), such as:

The first day of the Normandy invasion (D-Day) was actually 6 Jun. 1944.

Figure 3F:
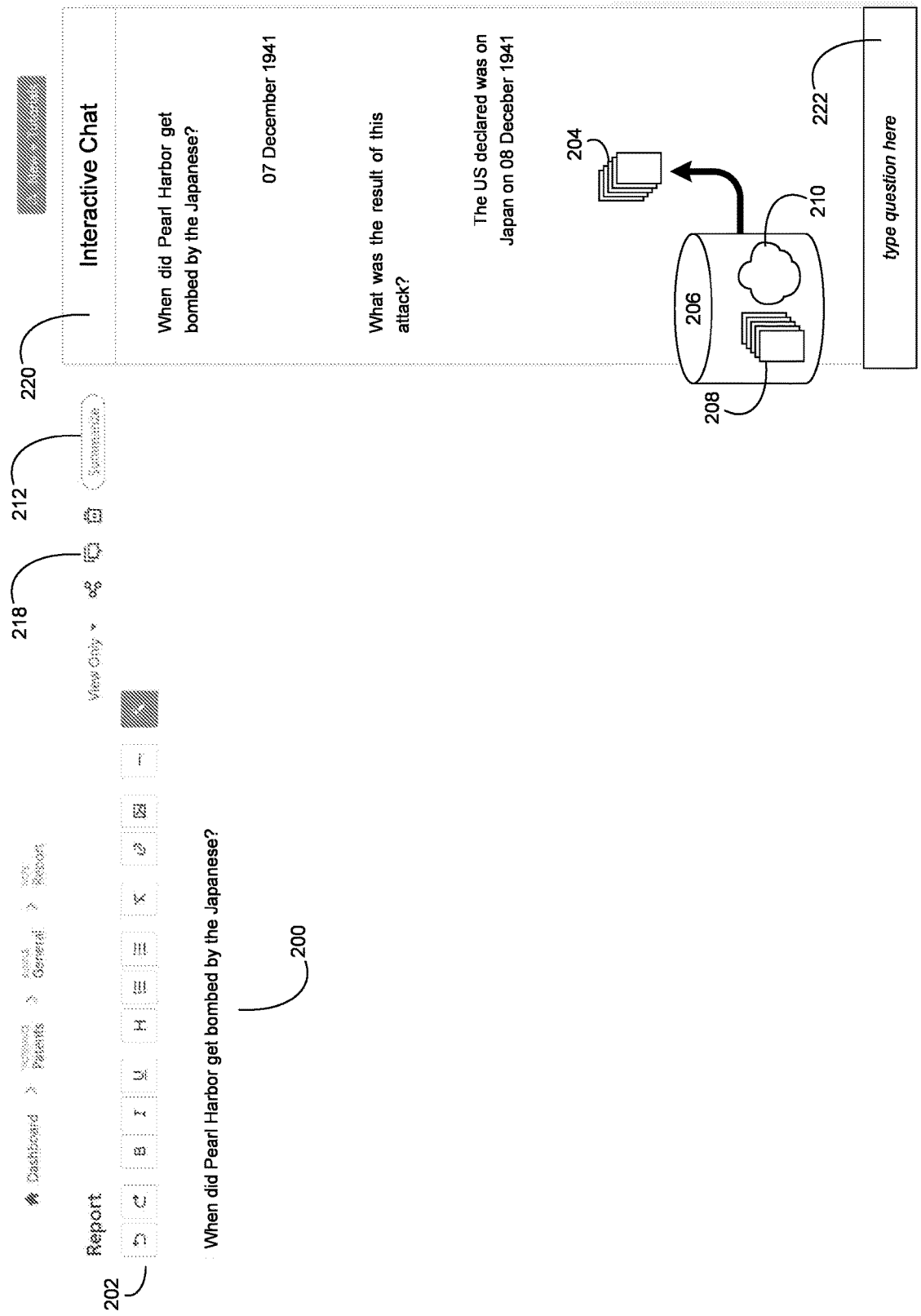

Additionally and referring also to FIG. 3F, content analysis process 10 may enable the user (e.g., user 36) to initiate an interactive chat session by selecting e.g., "chat" icon 218. Once initiated, content analysis process 10 may enable 118 the user (e.g., user 36) to define a query within a chat window (e.g., chat window 220), such as:

When did Pearl Harbor get bombed by the Japanese?

Content analysis process 10 may process 120 the query on the content repository (e.g., content repository 206), may generate 122 a result set, and may present 124 the result set to the user (e.g., user 36), such as:

Pearl Harbor was bombed by the Japanese on 7 Dec. 1941.

This interactive chat process may continue as shown in FIG. 3E. Further, this interactive chat process may be configured by content analysis process 10 to function in a fashion similar to a messenger application, wherein a user (e.g., user 36) may type a question within a question window (e.g., question window 222) to initiate/engage in/continue the interactive chat process.

BACK END

Figure 4:
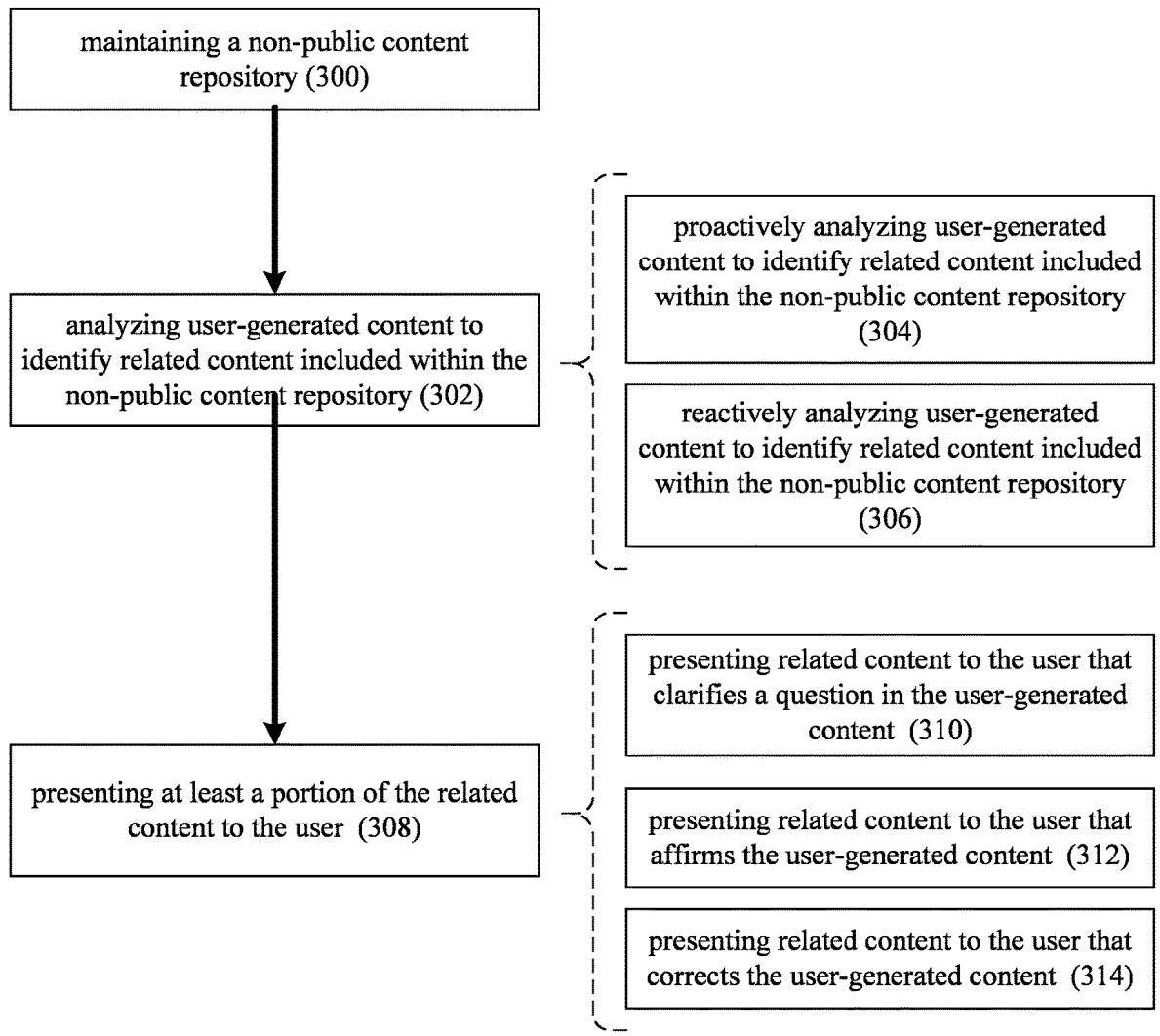
FIG. 4 is another flowchart of the content analysis process of FIG. 1 according to an embodiment of the present disclosure.

Referring also to FIG. 4 and as discussed above, content analysis process 10 may maintain 300 a non-public content repository (e.g., non-public content repository 208). As discussed above, the non-public content repository (e.g., non-public content repository 208) may include: non-public content and trusted public content. As discussed above, examples of such non-public content may include curated collection of documents/content obtained/identified by e.g., user 36, such as internal documents & content authored by/available to user 36 (e.g., a private collection of content that was authored/validated by user 36). As discussed above, examples of such trusted public content may include but are not limited to external documents & content identified/validated by user 36 (e.g., a trusted public website).

For example and concerning the manner in which content analysis process 10 may maintain 300 a non-public content repository (e.g., content repository 206), content analysis process 10 may process new material received for inclusion within non-public content repository (e.g., content repository 206) so that such material may be stored within various databases, examples of which may include but are not limited to primary databases (e.g., mongoDB), secondary databases (e.g., Lambda function+S3), and tertiary databases (e.g., ElasticSearch). The raw text from these documents (e.g., the new files) may be saved in the primary and tertiary databases. As these documents (e.g., the new files) are saved or updated in the primary database, the event triggers the semantic tokenization process, which transforms the documents (e.g., the new files) into vectors. This newly vectorized data may then get saved in the secondary database along with the document ID contained in the primary database.

As discussed above, content analysis process 10 may analyze 302 user-generated content (e.g., user-generated content 200) to identify related content (e.g., related content 204) included within the non-public content repository (e.g., non-public content repository 208). The manner in which content analysis process 10 may analyze 302 user-generated content 200 to identify related content 204 included within non-public content repository 208 was discussed above in greater detail. In summary, the analysis process may be achieved via a semantic search. A user (e.g., user 36) may type in a query or may trigger a text analysis, which may get tokenized into a multidimensional vector. This multidimensional vector may then be compared (e.g., via dot product) to the multidimensional vectors of all documents that the user has access to (e.g., those defined within content repository 206), wherein e.g., the twenty highest returning numbers may be returned as results (e.g., related content 204). The suggested documents may then be merged and categorized into a hierarchical feed comprised of keyword and semantic results for the user (e.g. user 36).

As discussed above, when analyzing 302 user-generated content (e.g., user-generated content 200) to identify related content (e.g., related content 204) included within the non-public content repository (e.g., non-public content repository 208), content analysis process 10 may:

proactively analyze 304 user-generated content (e.g., user-generated content 200) to identify related content (e.g., related content 204) included within the non-public content repository (e.g., non-public content repository 208), wherein content analysis process 10 may routinely (e.g., every few seconds/every few words) analyze 304 user-generated content 200 to identify related content 204 included within non-public content repository 208; and/or reactively analyze 306 user-generated content (e.g., user-generated content 200) to identify related content (e.g., related content 204) included within the non-public content repository (e.g., non-public content repository 208), wherein content analysis process 10 may stand by until the user (e.g., user 36) initiates the analysis 306 of user-generated content 200 to identify related content 204 included within non-public content repository 208.

As discussed above and as shown in FIGS. 3A-3E, content analysis process 10 may present 308 at least a portion of the related content (e.g., related content 204) to the user (e.g., user 36) in various formats.

For example and as discussed above, when presenting 308 at least a portion of the related content (e.g., related content 204) to the user (e.g., user 36), content analysis process 10 may present 310 related content (e.g., related content 204) to the user (e.g., user 36) that clarifies a question in the user-generated content (e.g., user-generated content 200).

Additionally and as discussed above, when presenting 308 at least a portion of the related content (e.g., related content 204) to the user (e.g., user 36), content analysis process 10 may present 312 related content (e.g., related content 204) to the user (e.g., user 36) that affirms the user-generated content (e.g., user-generated content 200).

Further and as discussed above, when presenting 308 at least a portion of the related content (e.g., related content 204) to the user (e.g., user 36), content analysis process 10 may present 314 related content (e.g., related content 204) to the user (e.g., user 36) that corrects the user-generated content (e.g., user-generated content 200).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device comprising:
    maintaining a non-public content repository including:
        storing one or more documents in a first database,
        tokenizing the one or more documents to create multidimensional vectors associated with the one or more documents; and
        saving the one or more multidimensional vectors associated with the one or more documents in a second database along with a document ID corresponding to the respective one or more documents stored in the first database; and
    analyzing user-generated content to identify related content included within the non-public content repository, including:
        tokenizing the user-generated content into a multidimensional vector; and
        comparing the multidimensional vector to the one or more multidimensional vectors associated with the one or more documents in the second database.

2. The computer-implemented method of claim 1 wherein analyzing user-generated content to identify related content included within the non-public content repository includes:
    proactively analyzing user-generated content to identify related content included within the non-public content repository.

3. The computer-implemented method of claim 1 wherein analyzing user-generated content to identify related content included within the non-public content repository includes:
    reactively analyzing user-generated content to identify related content included within the non-public content repository.

4. The computer-implemented method of claim 1 further comprising:
    presenting at least a portion of the related content to the user.

5. The computer-implemented method of claim 4 wherein presenting at least a portion of the related content to the user includes:
    presenting related content to the user that clarifies a question in the user-generated content.

6. The computer-implemented method of claim 4 wherein presenting at least a portion of the related content to the user includes:
    presenting related content to the user that affirms the user-generated content.

7. The computer-implemented method of claim 4 wherein presenting at least a portion of the related content to the user includes:
    presenting related content to the user that corrects the user-generated content.

8. The computer-implemented method of claim 1 wherein the user-generated content includes:
    user-generated content that was generated on a word processor.

9. The computer-implemented method of claim 1 wherein the non-public content repository includes:
    non-public content.

10. The computer-implemented method of claim 1 wherein the non-public content repository includes:
    trusted public content.

11. A computer program product residing on a non-transitory computer readable medium having a plurality of instructions stored thereon which, when executed by a processor, cause the processor to perform operations comprising:
    maintaining a non-public content repository including:
        storing one or more documents in a first database,
        tokenizing the one or more documents to create multidimensional vectors associated with the one or more documents; and
        saving the one or more multidimensional vectors associated with the one or more documents in a second database along with a document ID corresponding to the respective one or more documents stored in the first database; and
    analyzing user-generated content to identify related content included within the non-public content repository, including:
        tokenizing the user-generated content into a multidimensional vector; and
        comparing the multidimensional vector to the one or more multidimensional vectors associated with the one or more documents in the second database.

12. The computer program product of claim 11 wherein analyzing user-generated content to identify related content included within the non-public content repository includes:
    proactively analyzing user-generated content to identify related content included within the non-public content repository.

13. The computer program product of claim 11 wherein analyzing user-generated content to identify related content included within the non-public content repository includes:
    reactively analyzing user-generated content to identify related content included within the non-public content repository.

14. The computer program product of claim 11 further comprising:
    presenting at least a portion of the related content to the user.

15. The computer program product of claim 14 wherein presenting at least a portion of the related content to the user includes:
    presenting related content to the user that clarifies a question in the user-generated content.

16. The computer program product of claim 14 wherein presenting at least a portion of the related content to the user includes:
    presenting related content to the user that affirms the user-generated content.

17. The computer program product of claim 14 wherein presenting at least a portion of the related content to the user includes:
    presenting related content to the user that corrects the user-generated content.

18. The computer program product of claim 11 wherein the user-generated content includes:
    user-generated content that was generated on a word processor.

19. The computer program product of claim 11 wherein the non-public content repository includes:
    non-public content.

20. The computer program product of claim 11 wherein the non-public content repository includes:
    trusted public content.

21. A computing system including a processor and memory configured to perform operations comprising:
    maintaining a non-public content repository including:
        storing one or more documents in a first database,
        tokenizing the one or more documents to create multidimensional vectors associated with the one or more documents; and
        saving the one or more multidimensional vectors associated with the one or more documents in a second database along with a document ID corresponding to the respective one or more documents stored in the first database; and
    analyzing user-generated content to identify related content included within the non-public content repository, including:
        tokenizing the user-generated content into a multidimensional vector; and
        comparing the multidimensional vector to the one or more multidimensional vectors associated with the one or more documents in the second database.

22. The computing system of claim 21 wherein analyzing user-generated content to identify related content included within the non-public content repository includes:
    proactively analyzing user-generated content to identify related content included within the non-public content repository.

23. The computing system of claim 21 wherein analyzing user-generated content to identify related content included within the non-public content repository includes:
    reactively analyzing user-generated content to identify related content included within the non-public content repository.

24. The computing system of claim 21 further comprising:
    presenting at least a portion of the related content to the user.

25. The computing system of claim 24 wherein presenting at least a portion of the related content to the user includes:
    presenting related content to the user that clarifies a question in the user-generated content.

26. The computing system of claim 24 wherein presenting at least a portion of the related content to the user includes:
    presenting related content to the user that affirms the user-generated content.

27. The computing system of claim 24 wherein presenting at least a portion of the related content to the user includes:
    presenting related content to the user that corrects the user-generated content.

28. The computing system of claim 21 wherein the user-generated content includes:
    user-generated content that was generated on a word processor.

29. The computing system of claim 21 wherein the non-public content repository includes:
    non-public content.

30. The computing system of claim 21 wherein the non-public content repository includes:
    trusted public content.

* * * * *